United States Patent [19]

Randall

[11] 3,950,686

[45] Apr. 13, 1976

[54] SERIES REDUNDANT DRIVE SYSTEM

[75] Inventor: James Clyde Randall, Palos Verdes, Calif.

[73] Assignee: TRW Inc., Redondo Beach, Calif.

[22] Filed: Dec. 11, 1974

[21] Appl. No.: 531,843

[52] U.S. Cl. ................. 318/564; 318/45; 318/685; 310/112
[51] Int. Cl.² ........................................ B64C 13/18
[58] Field of Search ...... 318/564, 685, 45; 310/112, 310/114

[56] References Cited
UNITED STATES PATENTS

| 697,832 | 4/1902 | Fraser | 318/45 |
|---|---|---|---|
| 3,309,588 | 3/1967 | Martin et al. | 318/564 |
| 3,405,337 | 10/1968 | Popik | 318/564 |
| 3,538,413 | 11/1970 | Baylis et al. | 318/685 |
| 3,568,030 | 3/1971 | Faxon | 318/45 |

*Primary Examiner*—B. Dobeck
*Attorney, Agent, or Firm*—Daniel T. Anderson; Stephen J. Koundakjian; Donald R. Nyhagen

[57] ABSTRACT

Disclosed is a plurality of motors mechanically connected in series so as to provide operational redundancy. The shaft of a given motor is rigidly attached to the housing of the next motor in the series, so that rotation of the first shaft will cause the second motor and its shaft to rotate. Means are provided to prevent relative rotation of the rotors of the redundant motor(s). Other means are provided to detect failure of the operating motor and to activate another motor in the series when this occurs.

9 Claims, 4 Drawing Figures

SERIES REDUNDANT DRIVE SYSTEM

BACKGROUND OF INVENTION

A. Field of the Invention

This invention relates to a redundant drive system utilizing a plurality of electric motors or motor/gearheads in series.

B. Description of Prior Art

There are many types of apparatus utilizing an electric motor in which repair is difficult if not impossible when the motor fails. Examples are earth orbiting satellites, deeply submerged pumps, etc.

Many inventors have addressed themselves to the problem of utilizing redundant motors so that if a single motor fails another can substitute. Examples of patented art in this general area are U.S. Pat. Nos. 871,193 (E. W. Stull), 2,491,842 (B. A. Wells), 2,356,590 (J. H. Jacobsen), 3,538,413 (H. R. Baylis, et al), and possibly 3,309,588 (D. J. Martin, et al). Even insofar as these patents teach redundant drive mechanisms, each system is deficient in that the connection between the motors is susceptible to single point failure, i.e., each of these prior art designs incorporates a connecting clutch, lever, or some other mechanism which can fail to operate. Obviously if the coupling fails to operate, the fact that a backup motor is available is of little consequence since the backup power cannot be utilized.

SUMMARY OF THE INVENTION

Accordingly it is an object of this invention to provide a redundant drive mechanism comprising a plurality of motors whose mutual coupling is not susceptible to single point failure.

Briefly the apparatus of the present invention comprises a plurality of electric motors in series. The coupling between the motors is a rigid connection between the rotating shaft of one motor and the housing of the next motor. The rotating shaft of the next motor, when that motor is inactivated, does not rotate with respect to its housing because of the magnetic attraction between a permanent magnet comprising the rotor and one or more of the pole pieces of the motor armature.

Thus, if a motor in the series is operating, every mechanism between the shaft of that motor and the load rotates substantially rigidly with it.

Means are provided to detect whether or not such rotation is in fact occurring. This means is adapted, when failure occurs, to switch in another motor in the series and (preferably) to switch off the motor which has failed.

DETAILED DESCRIPTION OF PREFERRED EMBODIMENT

In the preferred embodiment of the present invention the redundant drive apparatus comprises two ordinary dc stepper motors in series. For most applications it is believed that a single redundancy is sufficient. However, it is to be understood that one may construct a series of any number of motors without departing from the spirit of the present invention.

Figure 1:
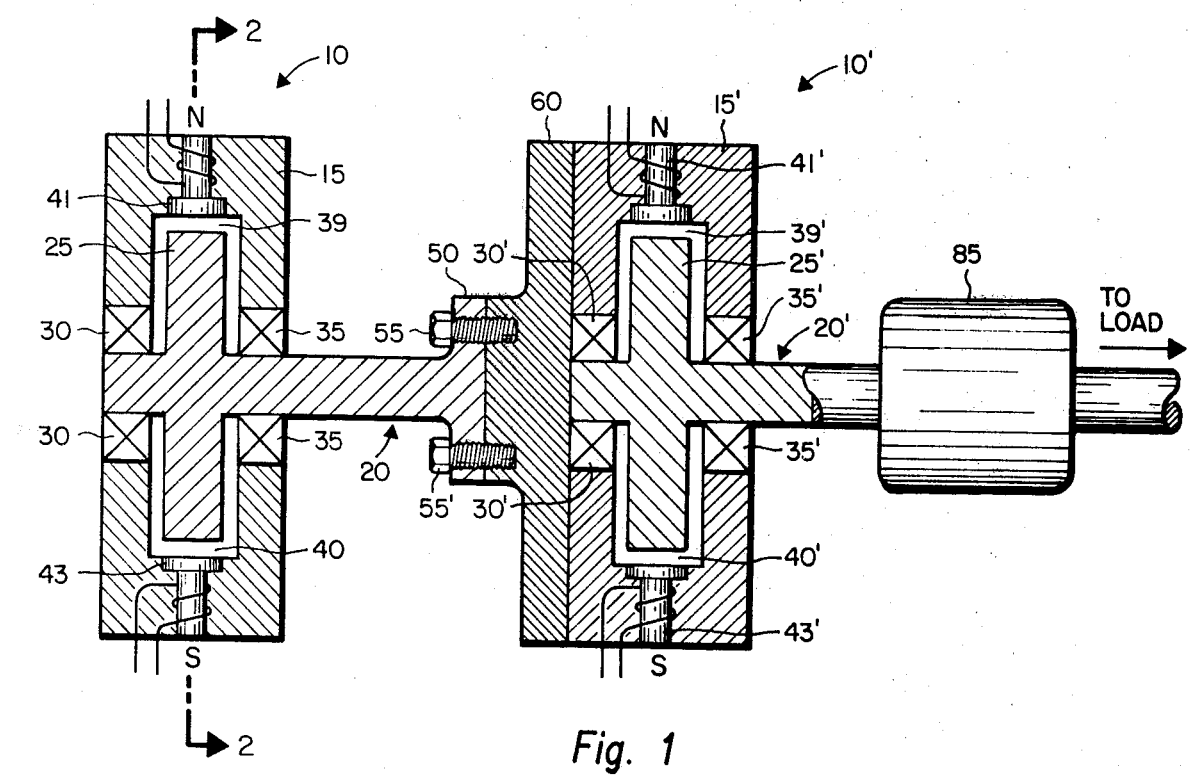
FIG. 1 is a schematic sectional view of a redundant drive apparatus according to the preferred embodiment of this invention.

Referring now to FIG. 1, the housing 15 of the first motor 10 is rigidly mounted. In the preferred embodiment of the present invention this motor is an entirely conventional four-pole dc stepper motor having a shaft 20 incorporating a permanent magnet rotor 25, the shaft being mounted within the housing on a symmetric pair of conventional bearings 30 and 35, respectively.

Figure 2:
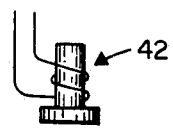
FIG. 2 is a view through section 2—2 of the apparatus shown in FIG. 1, showing, in detail, the relationship between the rotor and pole pieces of one of the motors comprising the apparatus.
Figure 2:
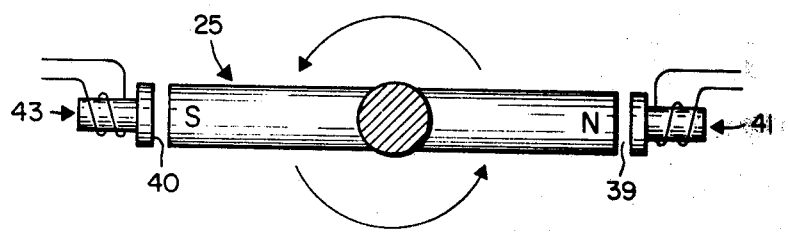
Figure 2:
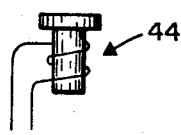

As shown in FIG. 2, the four poles 41, 42, 43 and 44, respectively, are symmetric about the axis of rotation of the shaft 20. The poles are sequentially activated by a solid state commutation device in a manner entirely conventional in the stepper motor art. In the configuration shown in FIG. 2, the sequence of activation would be: 41, 42, 43, 44, 41, 42 . . . . This causes the permanent magnet comprising the rotor 25 to rotate in a counter-clockwise direction to, in effect, "follow" the activated pole pieces.

The shaft 20 terminates in a disc-shaped flange 50 which is rigidly attached (in the preferred embodiment, by means of bolts 55) to the rear flange 60 of the housing 15' of the second motor 10'. In the preferred embodiment of the present invention this second motor is, in all respects, similar to the first motor 10. It incorporates a rotating shaft 25. This shaft is ultimately connected to the load, perhaps through gears, clutches or some other suitable mechanical means.

With the first motor 10 in operation and the second motor 10' inactivated, the shaft flange 50 of the first motor, being rigidly attached to the rear flange 60 of the housing of the second motor, causes the housing of the second motor to rotate rigidly with the shaft 20 of the first motor. Because of the strong attractive force between the permanently magnetized rotor 25' and the pole pieces 41' and 43', the shaft 20' of the second motor likewise turns rigidly with the shaft of the first motor. This strong magnetic attraction or detent torque is caused by the small spaces 39' and 40' separating the ends of the permanently magnetized rotor from the pole pieces 41' and 43' respectively, each composed of magnetic material.

The design of the rotor 25' and the pole pieces 41', 43' and the spacing between them can be readily adjusted by an ordinary practitioner to ensure that the magnetic detent force exerted is sufficient to hold the rotor in position (so that the shaft 20' can rotate with the shaft 20), while the second motor 10' is inactivated but not strong enough to prevent actual activation of the second motor when this becomes necessary. I.e., the detent torque exerted on the rotor must be substantial but less than the operational torque exerted by the pole pieces when the second motor is activated.

It will be readily understood from those reasonably skilled in the art to which this invention pertains that in the foregoing discussion the roles of the first motor 10 and the second motor 10' can be interchanged. In other words, the second motor could be the primary driver, while the first motor serves as backup. In any event the two motors are, in the preferred embodiment, identical, except that the shaft 20 of the first motor terminates in the enlarged flange 50 which is rigidly attached to the rear flange 60 of the second motor.

Figure 3:
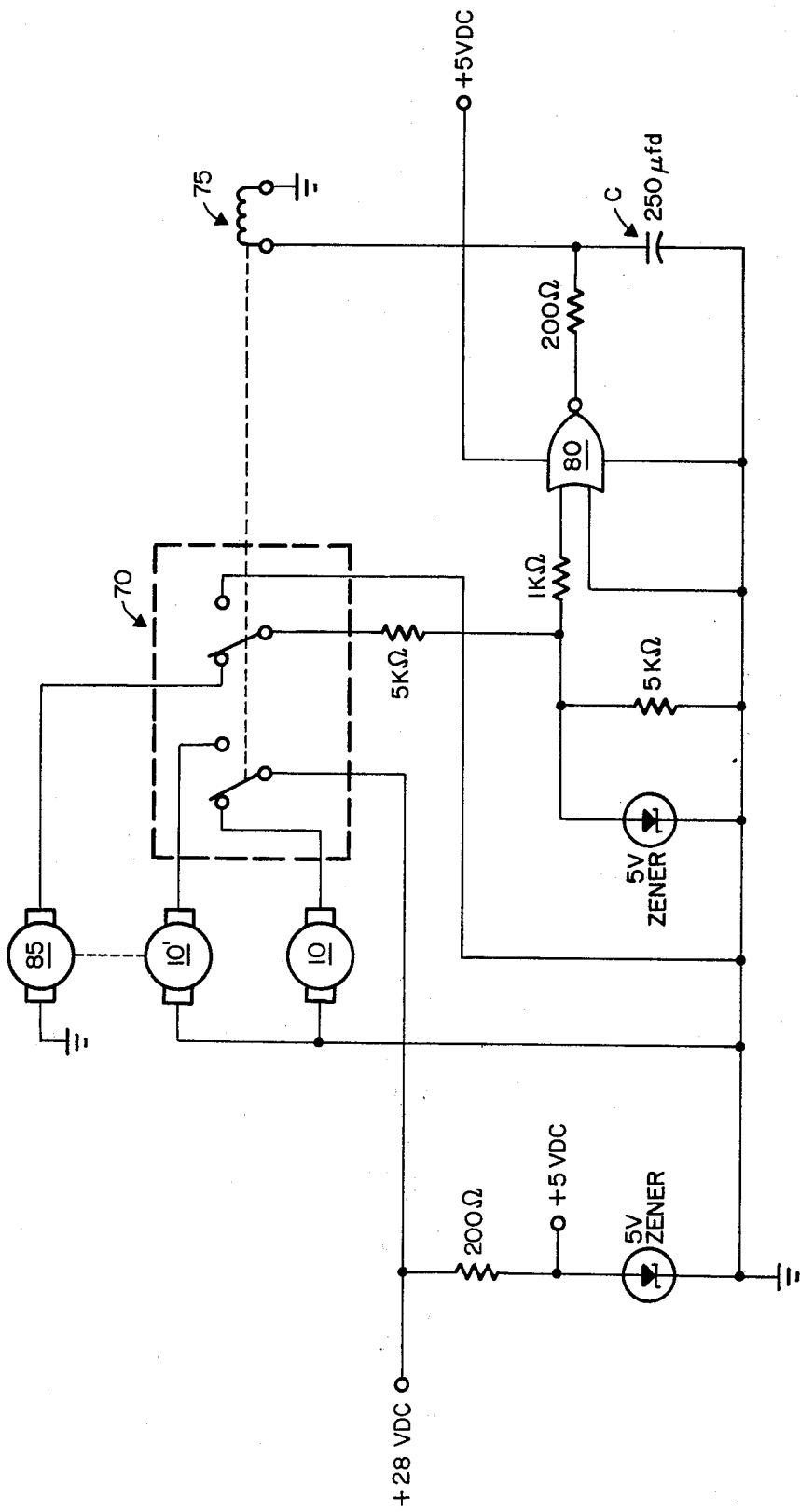
FIG. 3 is a schematic circuit diagram showing the preferred feedback mechanism causing the primary motor to drive the apparatus.
Figure 4:
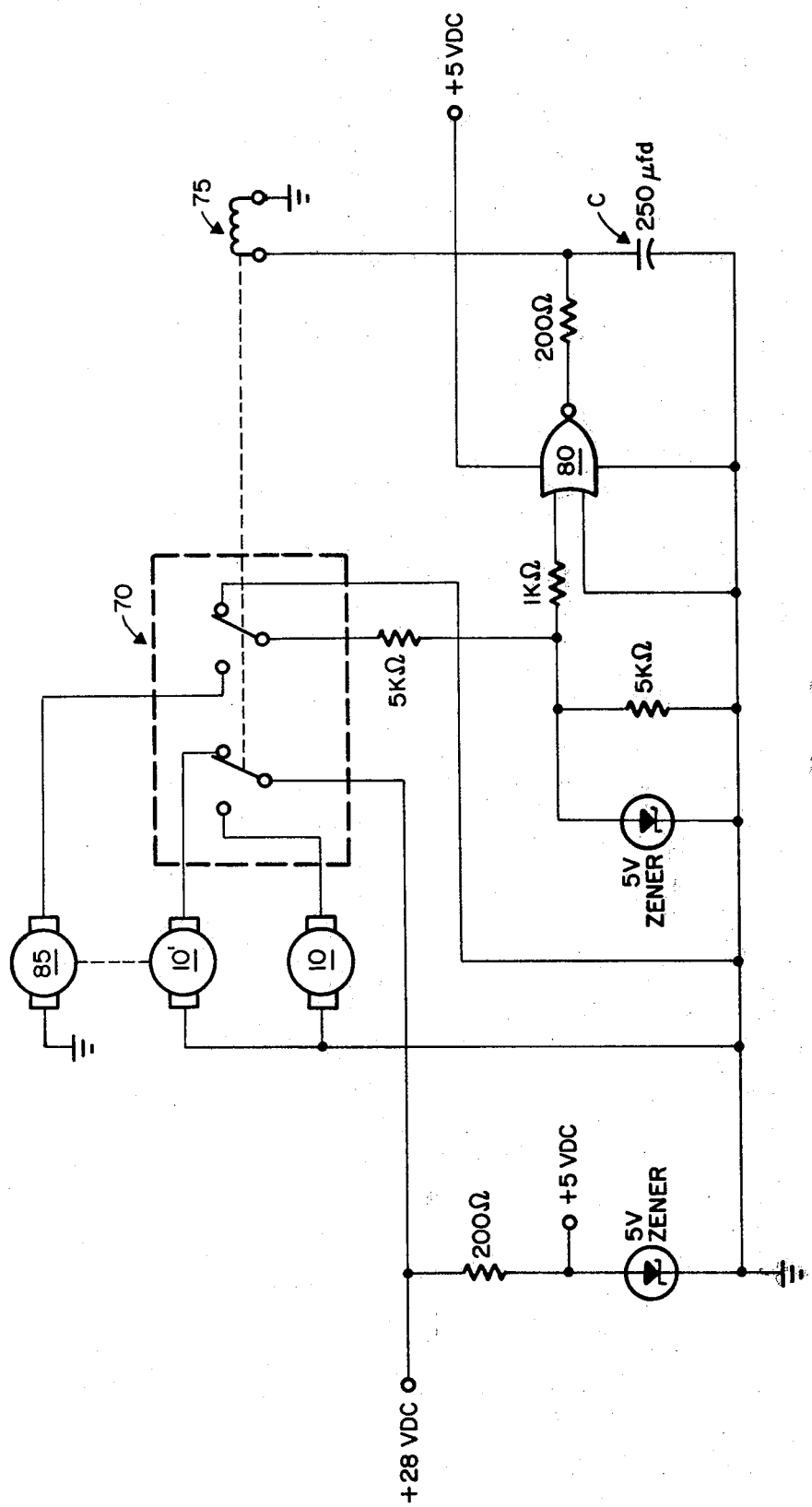
FIG. 4 is identical to FIG. 3 but shows the motor switched in a second position by which the backup motor is activated.

Attention will now be drawn to FIGS. 3 and 4 and a discussion of the means provided, in the preferred embodiment of this invention, for insuring that only one motor is operational at a given time.

FIG. 3 shows the feedback circuit in a first position corresponding to the condition where the primary motor 10 is in operation, the backup motor 10' is deactivated.

FIG. 4 shows the alternative position corresponding to the condition wherein the primary motor has failed or is otherwise deactivated and the backup motor is operational.

The mechanism within the circuit which ultimately accomplishes this transition is the two-position switch 70 which is operated by the relay 75.

The switch is controlled by logic whose core is a NOR gate 80. A generator 85 positioned on the final output shaft of the redundant drive mechanism (in the preferred embodiment, on shaft 20') generates current when that shaft rotates. When this occurs one of the inputs to the NOR gate is "high". The other input, being connected to ground, is always "low". In this condition the output from the NOR gate is low, and the relay 75 is deactivated. Thus, under this condition the switch is in the position shown in FIG. 3, whereby the primary motor 10 is activated, while the backup motor 10' is deactivated.

If the generator 85 fails to generate a current output, i.e., if the ultimate shaft fails to rotate, this means that the motor which was then intended to be the drive motor is no longer operative. In this case the output from the generator will represent a low input to the NOR gate. Since both inputs are low the output will be high. This will activate the relay 75, causing the two-position switch to be pulled into the position shown in FIG. 4. This will, in turn, cause the "dead" motor 10 to be deactivated and the backup motor 10' to be activated.

The capacitor C serves a delaying function. Its purpose is to insure that in the short span of time between the initial start-up or between steps of the primary motor 10 and the generation of sufficient current from the generator 85 to create a high input to the NOR gate 80, that the NOR gate will not be activated (with a 5-volt dc potential across it). Without this feature, the NOR gate would immediately become activated, and as soon as the primary motor were started up or between steps it would see a low input from the generator (because it had not yet begun to generate), and the NOR gate would cause the relay to switch off the primary motor and switch on the backup motor.

The preferred values of the various components comprising the circuit are shown in FIGS. 3 and 4. The 28-volt dc input represents the main power input to the motors and is merely chosen at 28-volts for convenience. The output from the generator 85 should be matched to the main power input (i.e., 28-volts dc) when the generator (and output shaft) are operating at full capacity. This can be accomplished in any convenient way by design of the generator armature and/or the use of a series resistance.

For extreme "non-single point" failure protection, the generator(s) and all controlling circuits can be made redundant by conventional parallel mechanization.

It is recognized that the current generator and the controlling circuit for sensing can be replaced by completely different mechanizations such as a position indication device with appropriate logic circuitry and relays for controlling the motor power.

I claim:
1. A series redundant drive apparatus, comprising;
    a. a first and a second electric motor, each comprising:
        a housing;
        an armature at least in part enclosed within said housing;
        a rotor within said armature adapted to selectively rotate with respect thereto; and a shaft coaxial with respect to the axis of rotation of said rotor, said shaft having a first end rigidly secured to said rotor and a second end projecting from said housing, the second end of the shaft of said first motor being rigidly secured to the housing of said second motor;
    b. means to selectively activate a single one of said motors;
    c. means to substantially prevent relative rotation between the rotor and armature of the other of said motors while said single one is activated;
    d. means to detect spontaneous de-activation of said single one of said motors; and
    e. means responsive to said detection means to activate said other motor.

2. Apparatus as recited on claim 1, wherein at least one of said electric motors comprises a stepper motor.

3. Apparatus as recited in claim 2, wherein both of said electric motors comprise stepper motors.

4. Apparatus as recited in claim 1, wherein said shaft is integral with said rotor.

5. Apparatus as recited in claim 1, wherein said second end is integral with at least a portion of the housing of said second motor.

6. Apparatus as recited in claim 1, wherein said second end is bolted to the housing of said second motor.

7. Apparatus as recited in claim 1, wherein said relative rotation prevention means comprises provision of magnetic attraction between the rotor of said other motor and at least a portion of the armature thereof.

8. Apparatus as recited in claim 1, wherein said detection means comprises a generator.

9. Apparatus as recited in claim 8, wherein said generator is operably connected to the shaft of said other motor.

* * * * *